US011666163B2

(12) United States Patent
Gharibian et al.

(10) Patent No.: US 11,666,163 B2
(45) Date of Patent: Jun. 6, 2023

(54) CONTACTLESS CONDIMENT DISPENSER

(71) Applicant: Sanispenser, Inc., Miami, FL (US)

(72) Inventors: Levon Gharibian, Glendale, CA (US);
Serge Gharibian, Burbank, CA (US);
Shaunt Gharibian, Burbank, CA (US)

(73) Assignee: Sanispenser, Inc., Miami, FL (US)

( * ) Notice: Subject to any disclaimer, the term of this patent is extended or adjusted under 35 U.S.C. 154(b) by 0 days.

(21) Appl. No.: 17/578,039

(22) Filed: Jan. 18, 2022

(65) Prior Publication Data
US 2022/0225802 A1 Jul. 21, 2022

Related U.S. Application Data
(60) Provisional application No. 63/139,132, filed on Jan. 19, 2021.

(51) Int. Cl.
*A47G 19/18* (2006.01)
(52) U.S. Cl.
CPC .................................. *A47G 19/183* (2013.01)
(58) Field of Classification Search
CPC .... A47G 19/183; G01F 15/063; G01F 11/125
See application file for complete search history.

(56) References Cited

U.S. PATENT DOCUMENTS

| | | | | |
|---|---|---|---|---|
| 2002/0056721 A1* | 5/2002 | Phillips | ................ | B67D 1/0051 222/1 |
| 2004/0226962 A1* | 11/2004 | Mazursky | ............ | A47K 5/1217 222/64 |
| 2007/0029343 A1* | 2/2007 | Sanfilippo | ............ | A47G 19/183 222/102 |
| 2012/0273519 A1* | 11/2012 | Marshall | ................... | B67D 7/36 222/336 |
| 2014/0138402 A1* | 5/2014 | Warren | ................. | B05B 9/0403 222/2 |
| 2018/0072557 A1* | 3/2018 | Bertness | ................. | G07F 13/06 |
| 2019/0002264 A1* | 1/2019 | Madden | ................... | B67D 1/10 |

FOREIGN PATENT DOCUMENTS

AU 2018264150 A1 * 6/2020
WO WO-2014105511 A2 * 7/2014 ........... B67D 1/0877

* cited by examiner

*Primary Examiner* — Bob Zadeh

(57) ABSTRACT

A touchless condiment dispensing system includes a top lid; a dispensing system housing, the top lid allowing a condiment to be loaded into the dispensing system housing; a display screen to display operational aspects of the touchless condiment dispensing system; and a tray to capture drippage or spillage of the condiment after dispensing. The touchless condiment dispensing system includes a condiment serving space, the condiment serving space between the dispending system housing and the tray, and configured to allow a user to place a dispensing cup in the condiment serving space. The touchless condiment dispensing system further includes a base assembly in which the tray rests; and/or a dispensing support housing, the dispending support housing to connect the dispensing system housing to the base assembly.

19 Claims, 18 Drawing Sheets

900

930

935

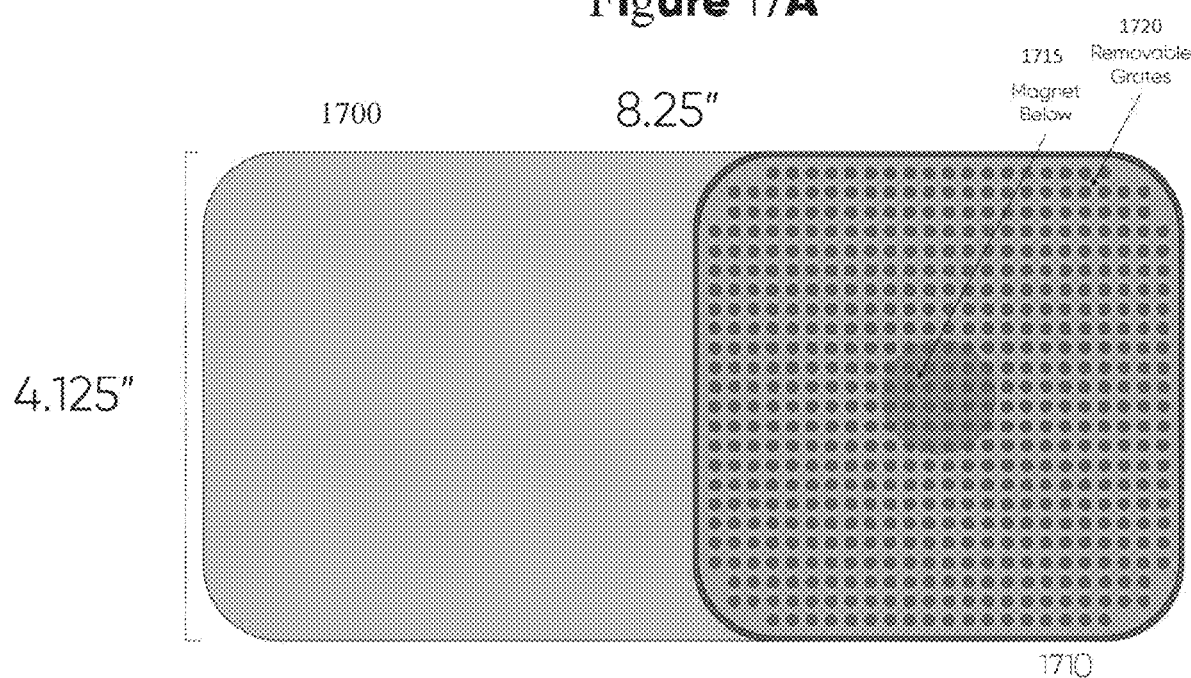
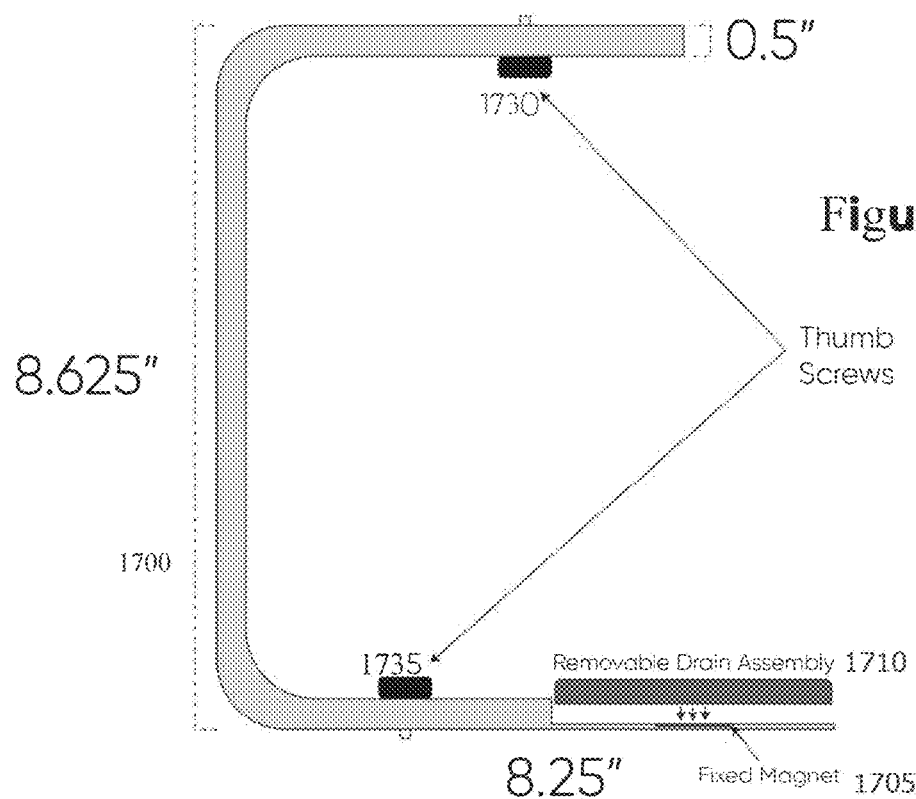

CONTACTLESS CONDIMENT DISPENSER

RELATED APPLICATIONS

This application claims priority to U.S. provisional patent application Ser. No. 63/139,132, filed Jan. 19, 2021, entitled "Contactless Condiment Dispenser," the entire disclosure and content of which is hereby incorporated by reference.

BACKGROUND OF THE INVENTION

Bacteria, germs and microbes are present in public settings such as restaurants, bars and/or taverns. With the outbreak of Covid-19, it has become important to minimize human contact with surfaces as much as possible to minimize and/or eliminate the spread of the bacteria, germs and/or microbes. Condiments are an important part of food industry and the public desires to have quick access to condiments but wants to have a safer option where they are not touching a surface that someone else has recently touched. It is too expensive for food service providers to provide individual condiment packages to consumers. Accordingly, a need exists for a condiment delivery system that minimizes human touch and is also economical for food services providers.

BRIEF DESCRIPTION OF DRAWINGS

FIG. 17A illustrates a top view of the base assembly according to some embodiments; and FIG. 17B illustrates a side view of the base assembly according to some embodiments.

DETAILED DESCRIPTION OF THE INVENTION

Figure 1:
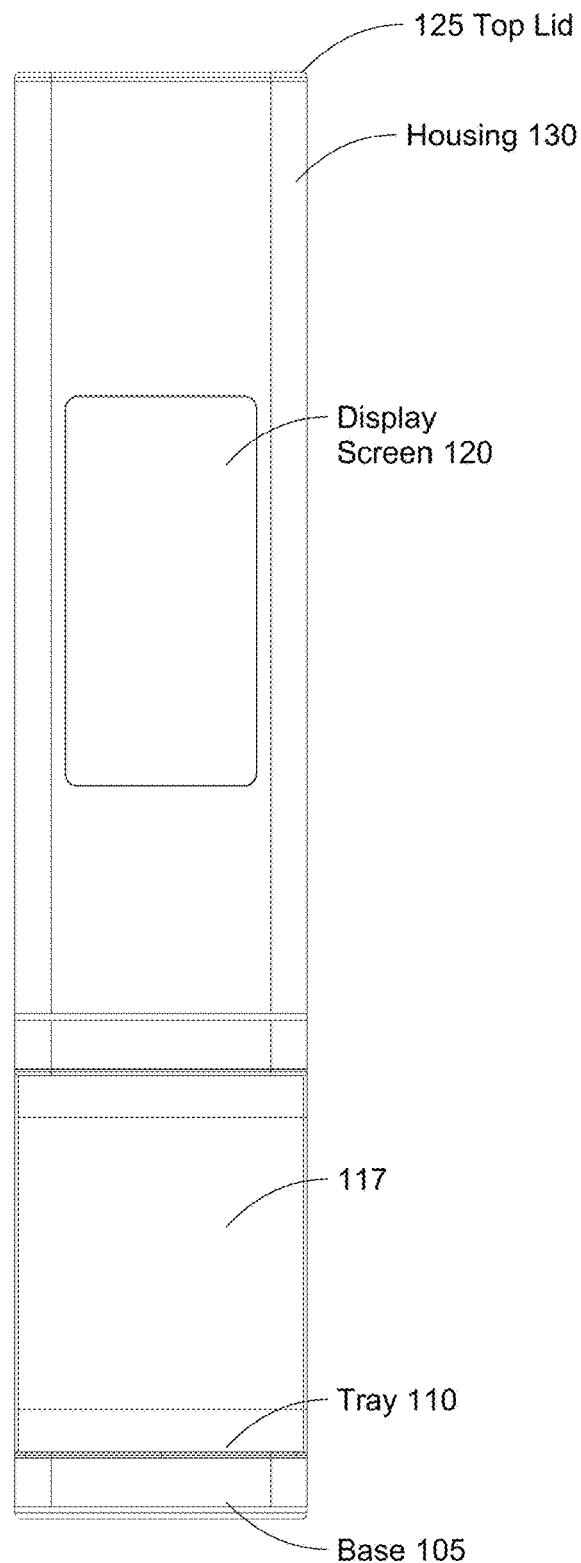
FIG. 1 illustrates a front view of a touchless condiment dispensing system according to some embodiments.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

An automated, touchless condiment dispensing system is described herein. In an embodiment, a touchless condiment dispensing system operates by having a consumer placing their hand or a dispensing receptacle of cup under a sensor of the dispensing system. When the sensor detects the consumer's hand or dispensing receptacle or cup, the dispensing system is automatically activated and a preset amount of a condiment may be dispensed into the dispensing receptacle or cup. There is no user contact with the touchless condiment dispensing system. Accordingly, there is no need for cleaning between consumer interactions with the systems. The owner or operator may determine an amount of condiment that is dispensed with each consumer interaction and/or sensor detection through a system's user interface. An owner or operator may communicate with one or more touchless condiment dispensing systems (and/or the associated user interface) through a software application on an external computing device (e.g., such as a laptop computing device, a mobile communication device, and/or a tablet computing device). In some embodiments, other computing devices may also be utilized (e.g., smart watches, wearable computing devices, smart eye glasses) to communicate with the one or more touchless condiment dispensing systems. In some embodiments, the automated, touchless condiment dispensing system may be free-standing or alternatively may be mounted to a vertical surface, such as a wall surface (through fasteners and/or adhesives on a back surface of the touchless condiment dispensing system. In some embodiments, a housing of an automated, touchless condiment dispensing system may include the one or more condiments (e.g., condiment reservoirs or containers). In some embodiments, the condiment reservoirs or containers may be located outside of the touchless condiment dispensing system and the condiment (or condiments) may be delivered via one or more tubes or hoses running between the condiment (s) reservoir(s) or containers and/or the condiment housing. In some embodiments, the automated touchless condiment dispensing system may dispense a single condiment or condiment type, or in alternative embodiments, the condiment dispensing system may be configured to dispense two or more condiments. Condiments may include ketchup, mayonnaise, mustard(s), special house or provider sauces, hot sauce, tabasco sauce, dairy or non-dairy creamer, simple syrups or sweeteners (including, but not limited to maple syrup, honey or agave), ranch dressing, etc. The condiments or sauces are not limited to the items described above and may be any sauce or liquid that may be able to be jetted or dispensed.

Figure 2:
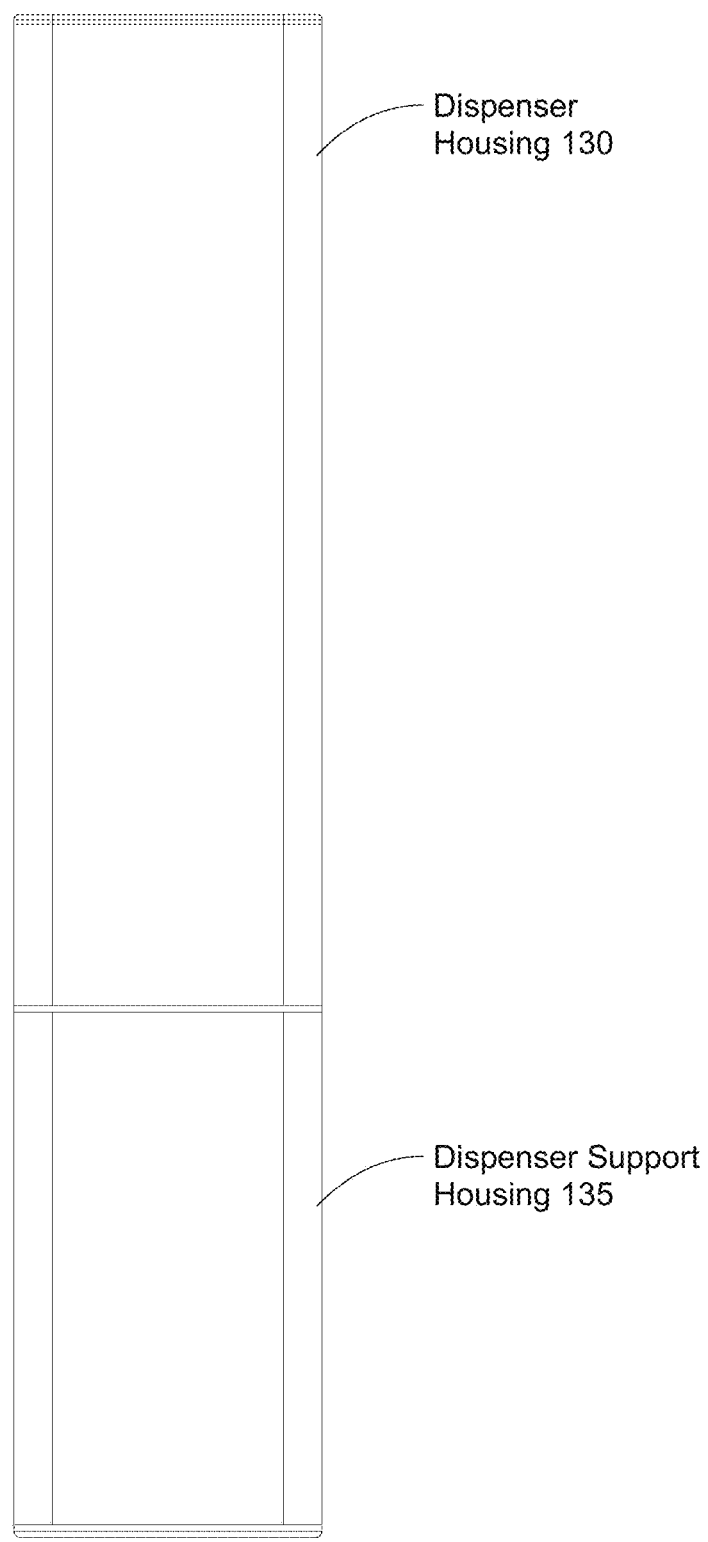
FIG. 2 illustrates a back view of a touchless condiment dispensing system according to some embodiments.
Figure 3:
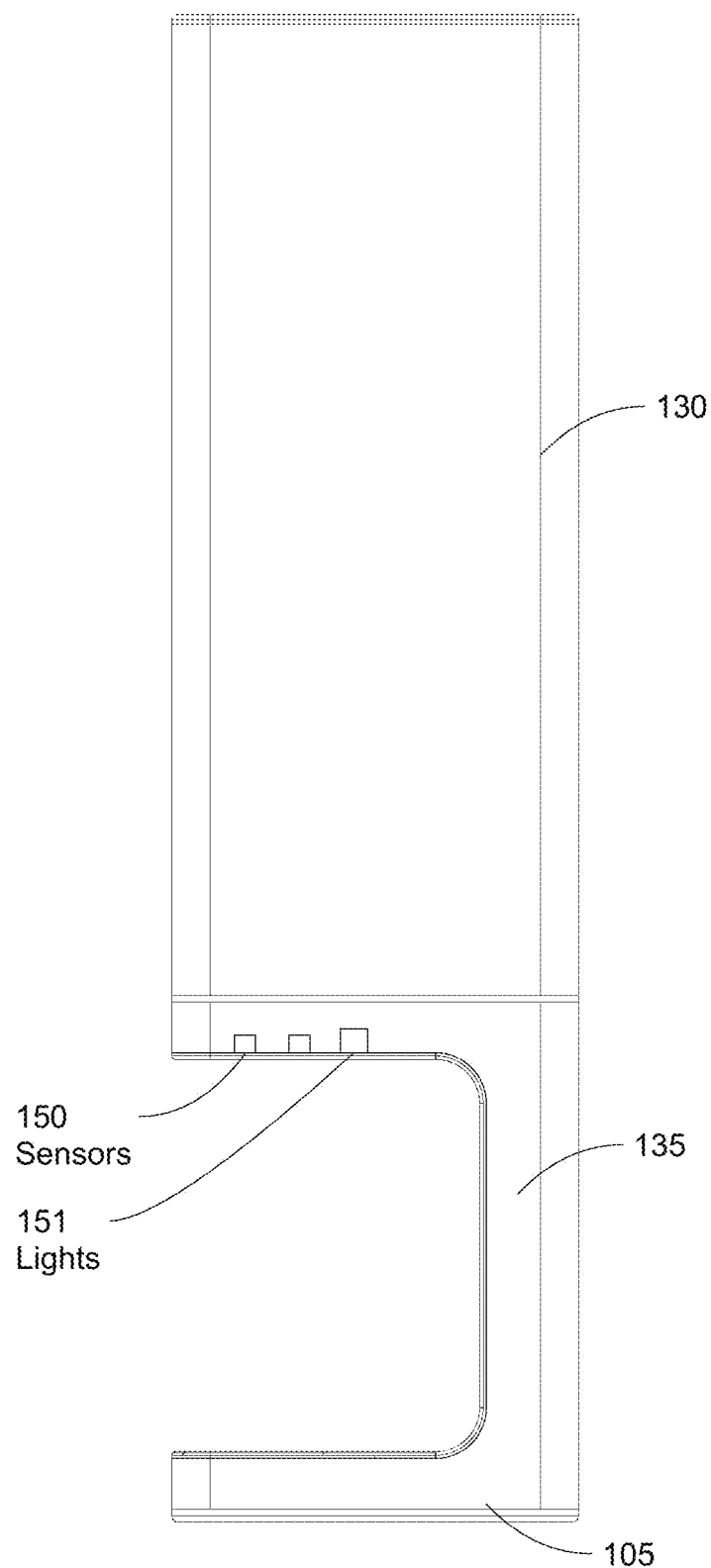
FIG. 3 illustrates a right side view of the touchless condiment dispensing system according to some embodiments.
Figure 4:
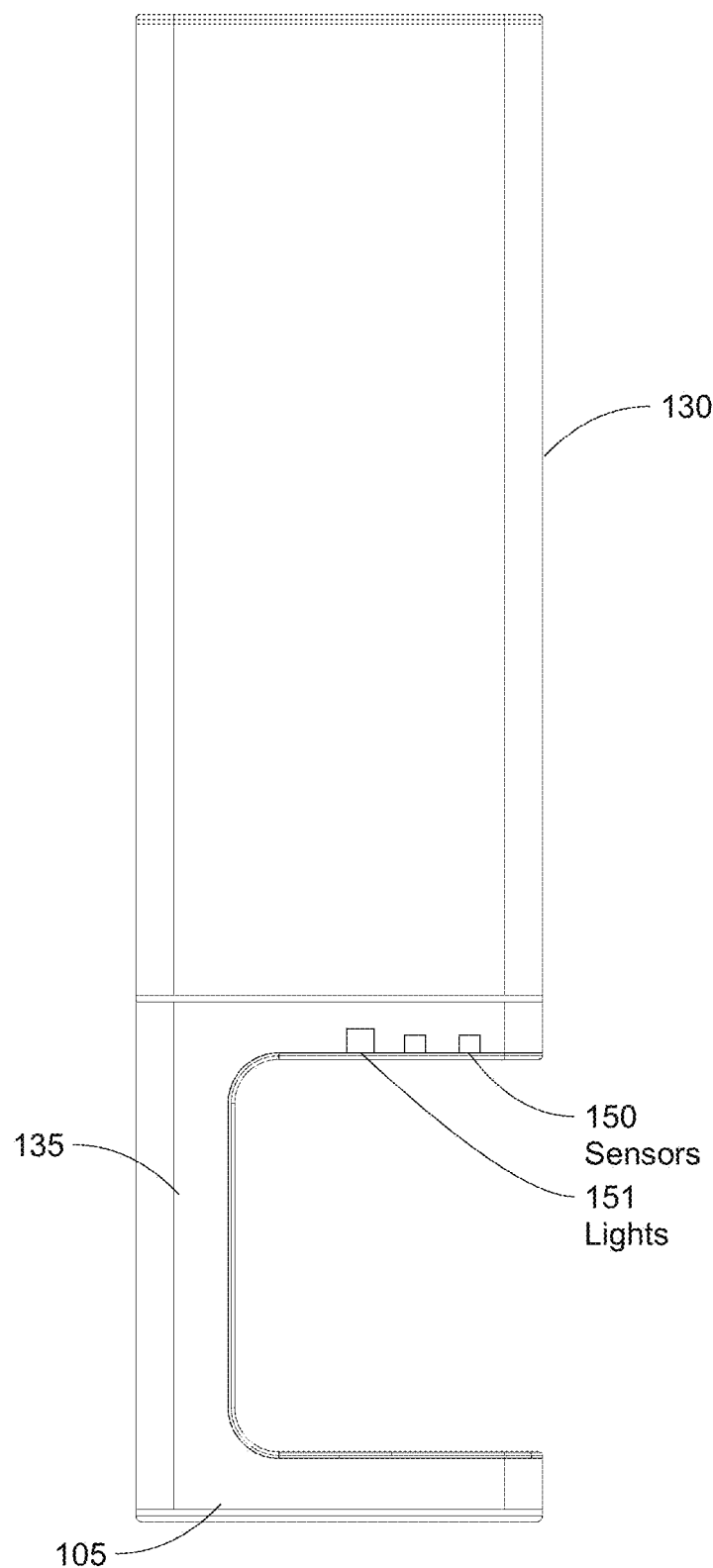
FIG. 4 illustrates a left side view of the touchless condiment dispensing system according to some embodiments.
Figure 5:
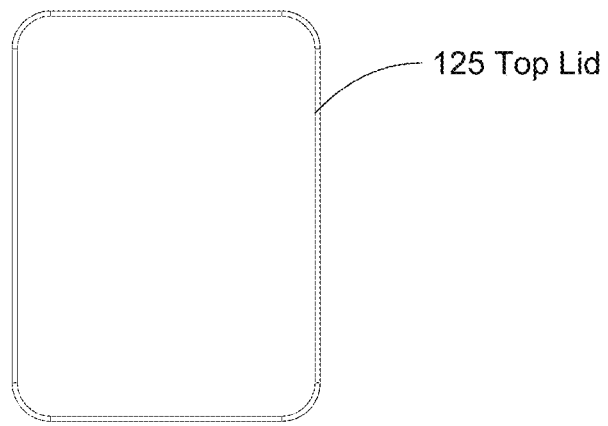
FIG. 5 illustrates a top view of the touchless condiment dispensing system according to some embodiments.
Figure 6:
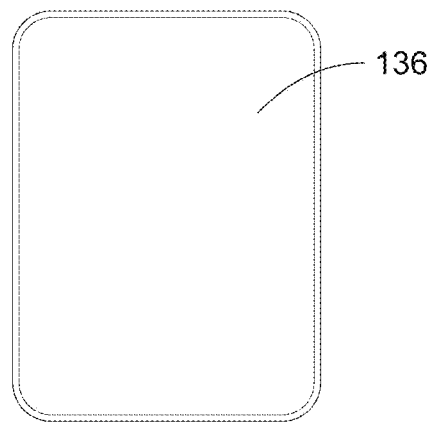
FIG. 6 illustrates a bottom view of the touchless condiment dispensing system according to some embodiments.

FIG. 1 illustrates a front view of a touchless condiment dispensing system according to some embodiments. FIG. 2 illustrates a back view of a touchless condiment dispensing system according to some embodiments. FIG. 3 illustrates a right-side view of the touchless condiment dispensing system according to some embodiments. FIG. 4 illustrates a left-side view of the touchless condiment dispensing system according to some embodiments. FIG. 5 illustrates a top view of the touchless condiment dispensing system according to some embodiments. FIG. 6 illustrates a bottom view of the touchless condiment dispensing system according to some embodiments.

Figure 7:
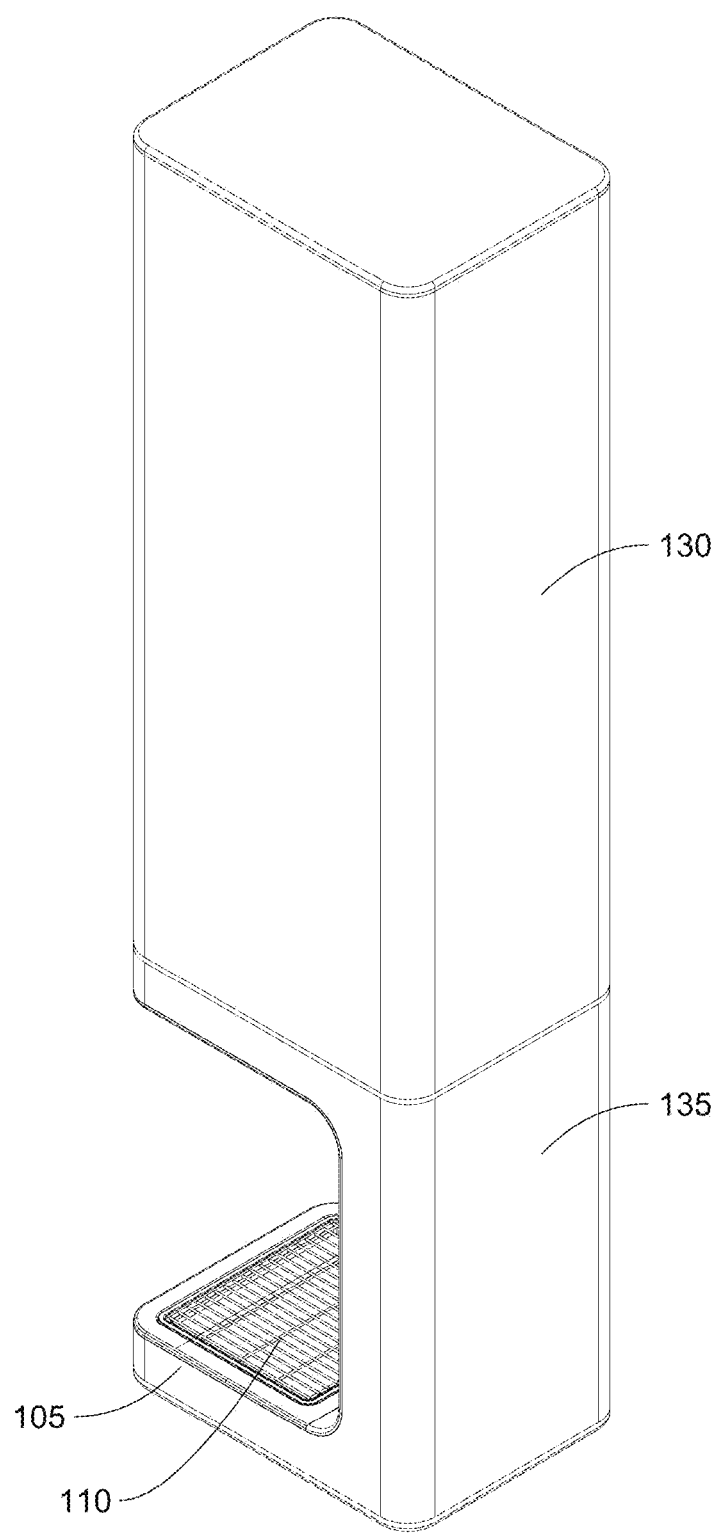
FIG. 7 illustrates a rear top perspective view of the touchless condiment dispensing system according to some embodiments.
Figure 8:
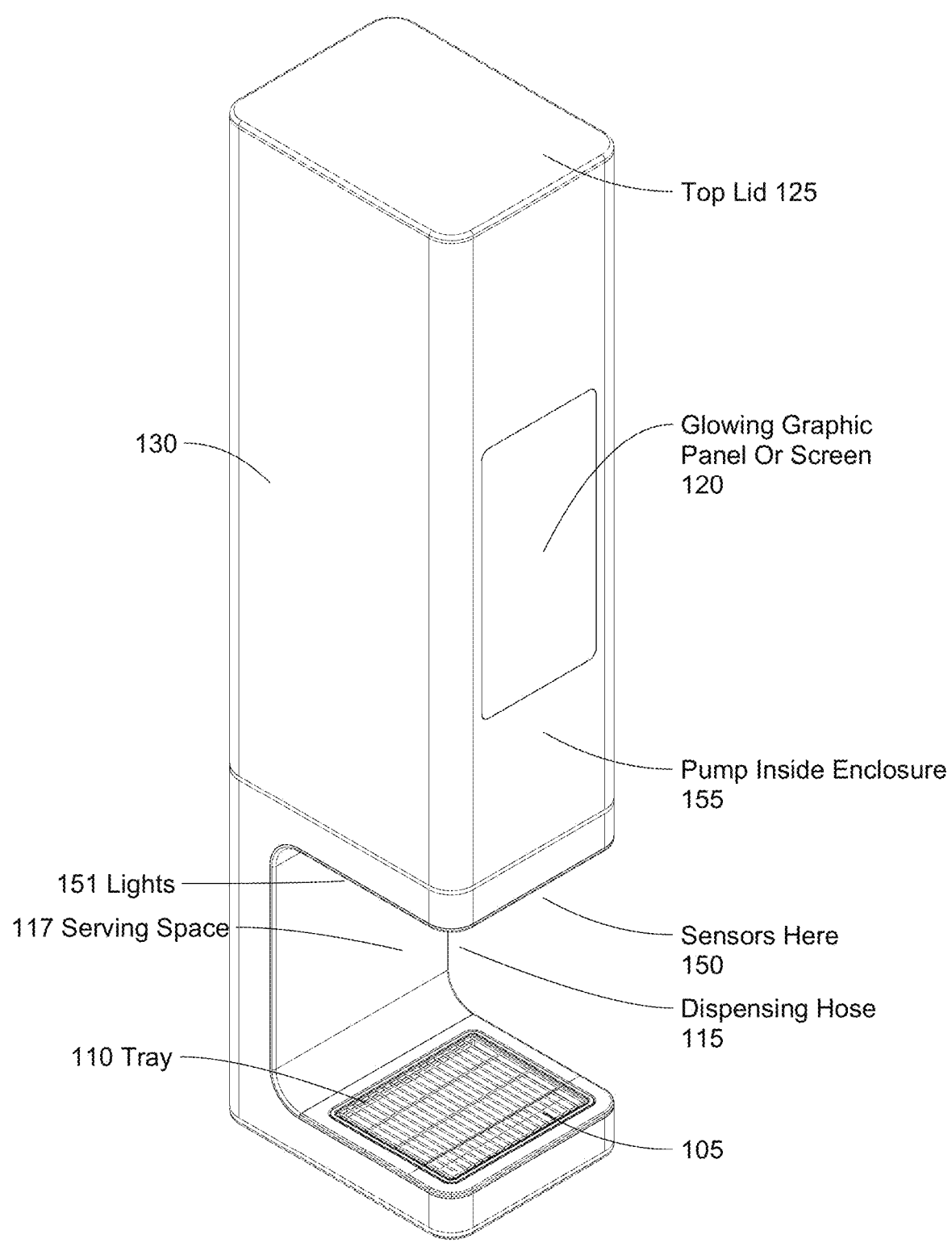
FIG. 8 illustrates a front perspective view according to some embodiments.

FIG. 7 illustrates a rear top perspective view of the touchless condiment dispensing system according to some embodiments. FIG. 8 illustrates a front perspective view according to some embodiments. As is shown in FIGS. 1 to 8, the touchless condiment dispensing system includes a top lid 125, a dispensing system housing 130, a display screen 120, a condiment serving space 117, a tray 110, a base assembly 105 and/or a dispensing support housing 135. The dispensing support housing 135 may be also referred to as a table stand and/or wall mount structure. In some embodiments, the touchless condiment dispensing system 100 includes a bottom surface 136 of the dispensing support housing 135. In some embodiments, a front side of the dispensing support housing 135 has one or more sensors 150 and/or one or more lights 151 integrated therein and/or a portion of a dispensing hose 115 running through and/or integrated therein. In some embodiments, a dispensing system housing 130 may include a pump or pump assembly 155 and/or may have a portion of the dispensing hose or tubing integrated therein. In some embodiments, as shown in the side views of FIGS. 3 and 4, the dispensing support housing 135 forms a U-shape, where the opening of the U is facing the consumer (e.g., the front of the touchless condiment dispensing system 100). In some embodiments, a top portion of the dispensing support housing 130 or (table mount or wall mount structure) is where the sensors 150 and/or one or more lights 151 are located and where a bottom portion (or dispensing portion) of the dispensing hose or channel 115 is located. This bottom portion is where the condiment or condiments are dispensed to the consumer. The base assembly 105 is connected to the dispensing support housing 135.

The base assembly 105 includes a tray assembly or tray 110. In some embodiments, the one or more lights 151 may provide visibility or brightness to the area where the consumer may place their hand and/or dispensing cup to receive the dispensed condiment.

In some embodiments, the tray 110 may be removable. In some embodiments, the tray 110 may be a grid with vents or openings to allow remnants or spillage of condiments to be caught and not touch a floor or table surface. In some embodiments, the tray 110 may capture any liquid portion or remnants of the dispensed condiment that is not located in a condiment receptacle. In some embodiments, the dispensing system housing 130 may include a pump assembly 155, a graphic screen 120 for displaying advertisements and/or graphics, a portion of the condiments tubing or hosing and/or a top lid 125.

Figure 9A:
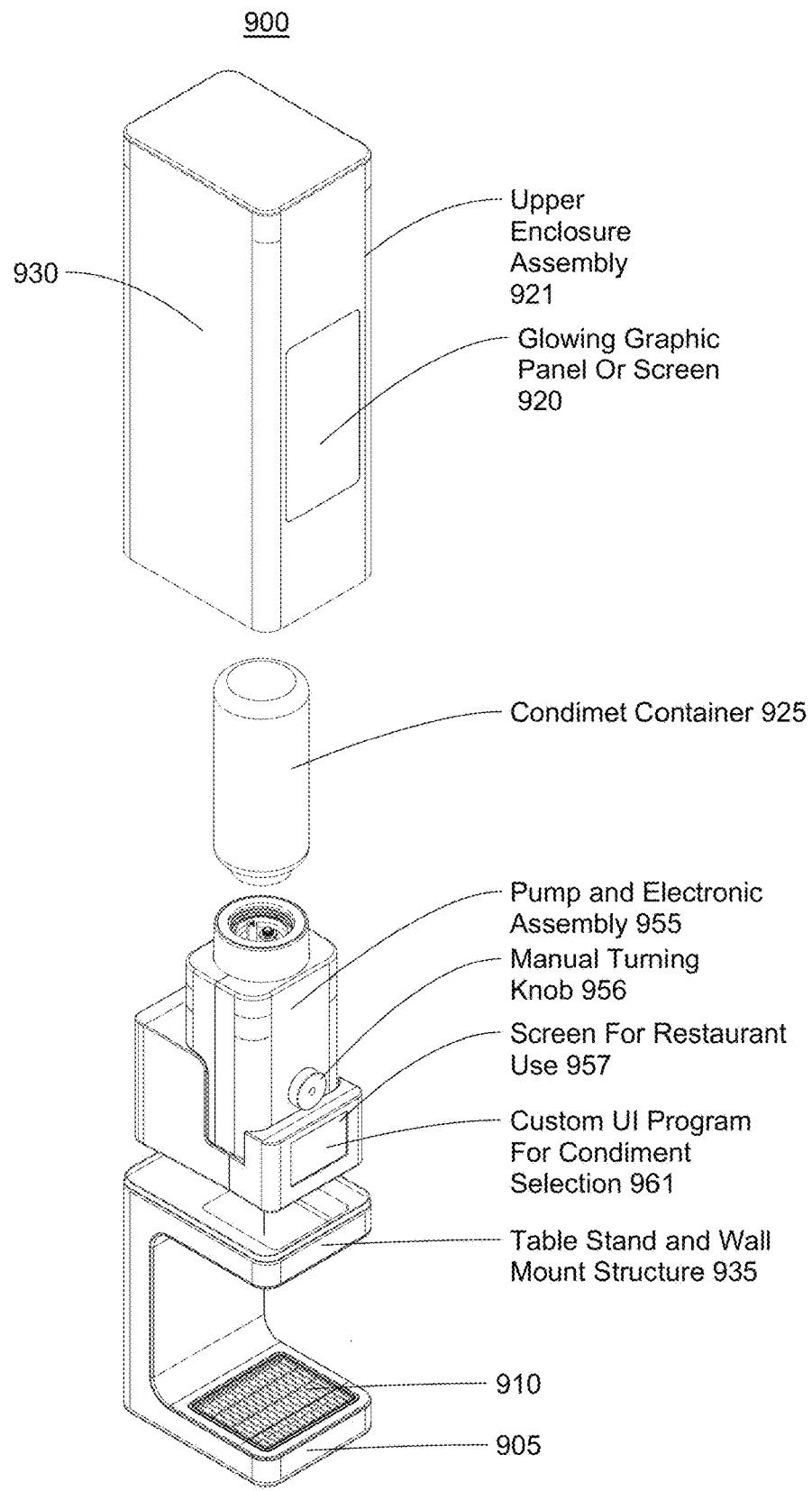
FIG. 9A illustrates a top perspective view of the touchless condiment dispensing system according to some embodiments.

FIG. 9A illustrates a top perspective view of the touchless condiment dispensing system according to some embodiments. In some embodiments, the touchless condiment dispensing system 900 includes the condiment system housing 930 and the table stand or wall mount structure 935. In some embodiments, the condiment system housing 930 may include an enclosure assembly 921 (an upper enclosure assembly), a graphic screen or panel 920, a condiment container or reservoir 925, a pump and/or electronic assembly 955, a manual turning knob 956, a custom user interface 961, a portion of condiment tubing (not shown) and/or an input screen 957. In some embodiments, the table stand or wall mount structure 935 includes one or more ultrasonic sensors and one or more lights (not shown in FIG. 9A) and a bottom portion of the condiment tubing (not shown in FIG. 9A), a base 905 and/or a tray 910.

Figure 9B:
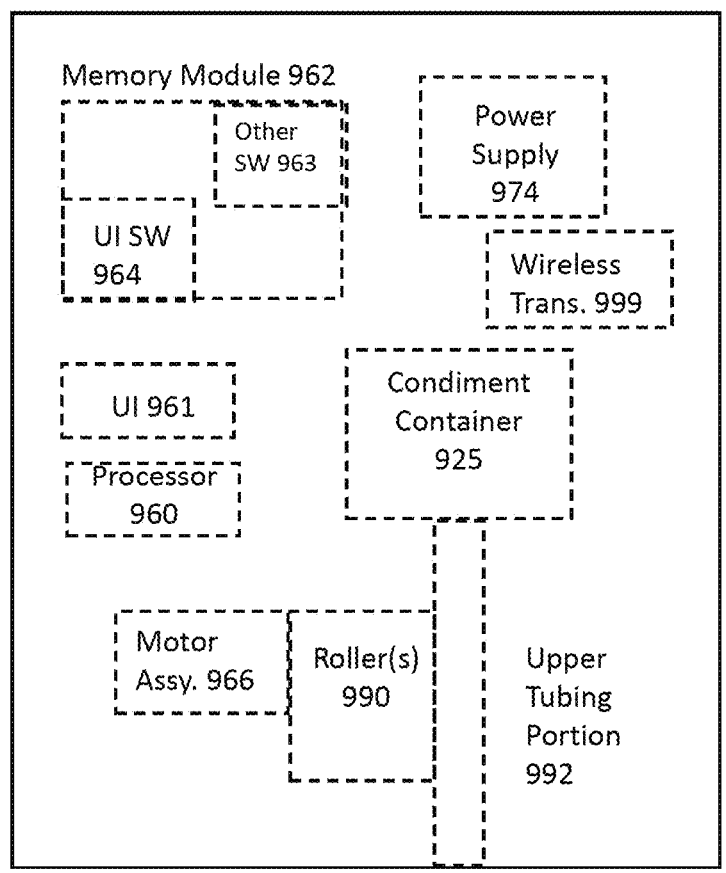
FIG. 9B illustrates a block diagram of the touchless condiment dispensing system according to some embodiments.
Figure 9B:
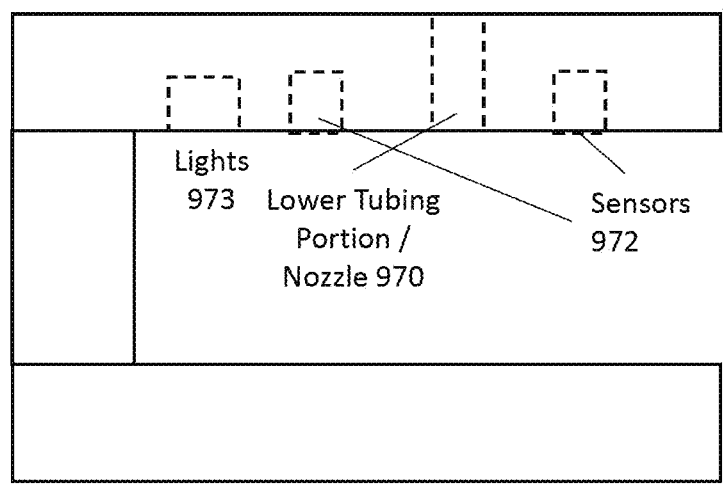

FIG. 9B illustrates a block diagram of the touchless condiment dispensing system according to some embodiments. In some embodiments, the condiment system housing 930 includes a motor assembly 966, one or more processors 960, one or more memory modules or devices 962, user interface computer-readable instructions 964, and/or other computer-readable instructions 963. In some embodiments, the condiment system housing 930 may also include a power supply 974. In some embodiments, the power supply 974 may be a battery. In some embodiments, the power supply 974 may be removable and/or replaceable. In some embodiments, the power supply 974 may be powered via an external source. In some embodiments, the touchless condiment dispensing system may also include solar cells or panels that are installed on outside surfaces of the touchless condiment dispensing system. In these embodiments, the one or more solar cells or panels and/or the associated conversion circuitry may be the external source of power. In some embodiments, the condiment system housing 930 includes an upper section 992 of the condiment tubing 977. In some embodiments, the table stand and wall mount structure 935 includes one or more sensors 972 (e.g., ultrasonic sensors), one or more lights 973 and/or a lower portion or section of the condiment tubing 970. The one or more sensors 972 may be light sensors, magnetic sensors, RFID sensors, and/or other sensors that are able to detect an object and/or a hand that is underneath the sensors. In some embodiments, the sensors 972 may include internal power (or batteries) and thus may not need any power from the condiment system housing 930 or from an external source. In some embodiments, the touchless condiment dispensing system may utilize radar, LiDAR and/or an imaging device (or camera) as a sensing device for the user's hand. In some embodiments, the touchless condiment dispensing system may include one or more wireless communication transceivers 999 that may be utilized to communicate with other touchless condiment dispensing systems and/or with other computing devices or mobile communication devices.

Figure 10:
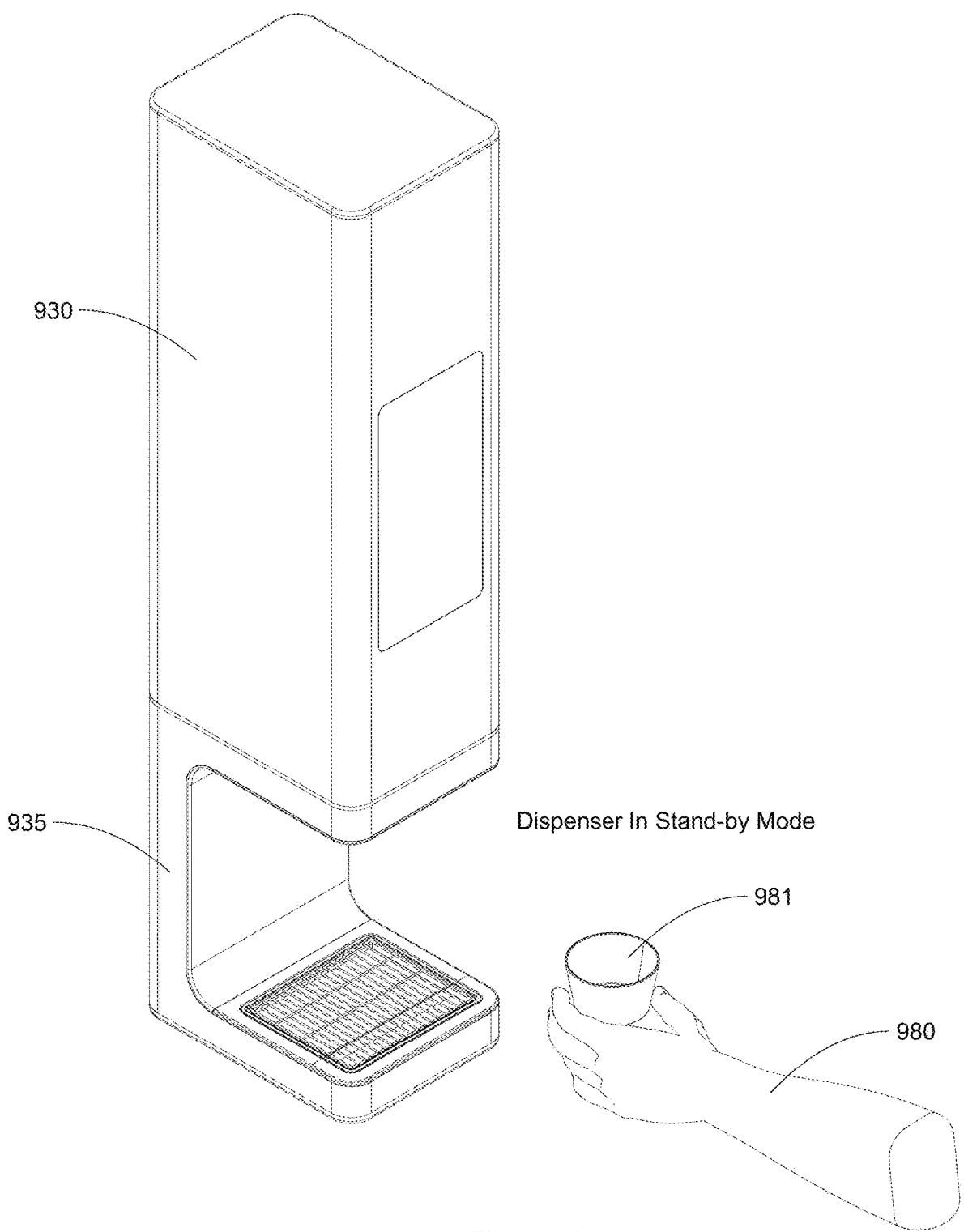
FIG. 10 illustrates a touchless condiment dispensing system in a stand-by mode according to some embodiments.
Figure 11:
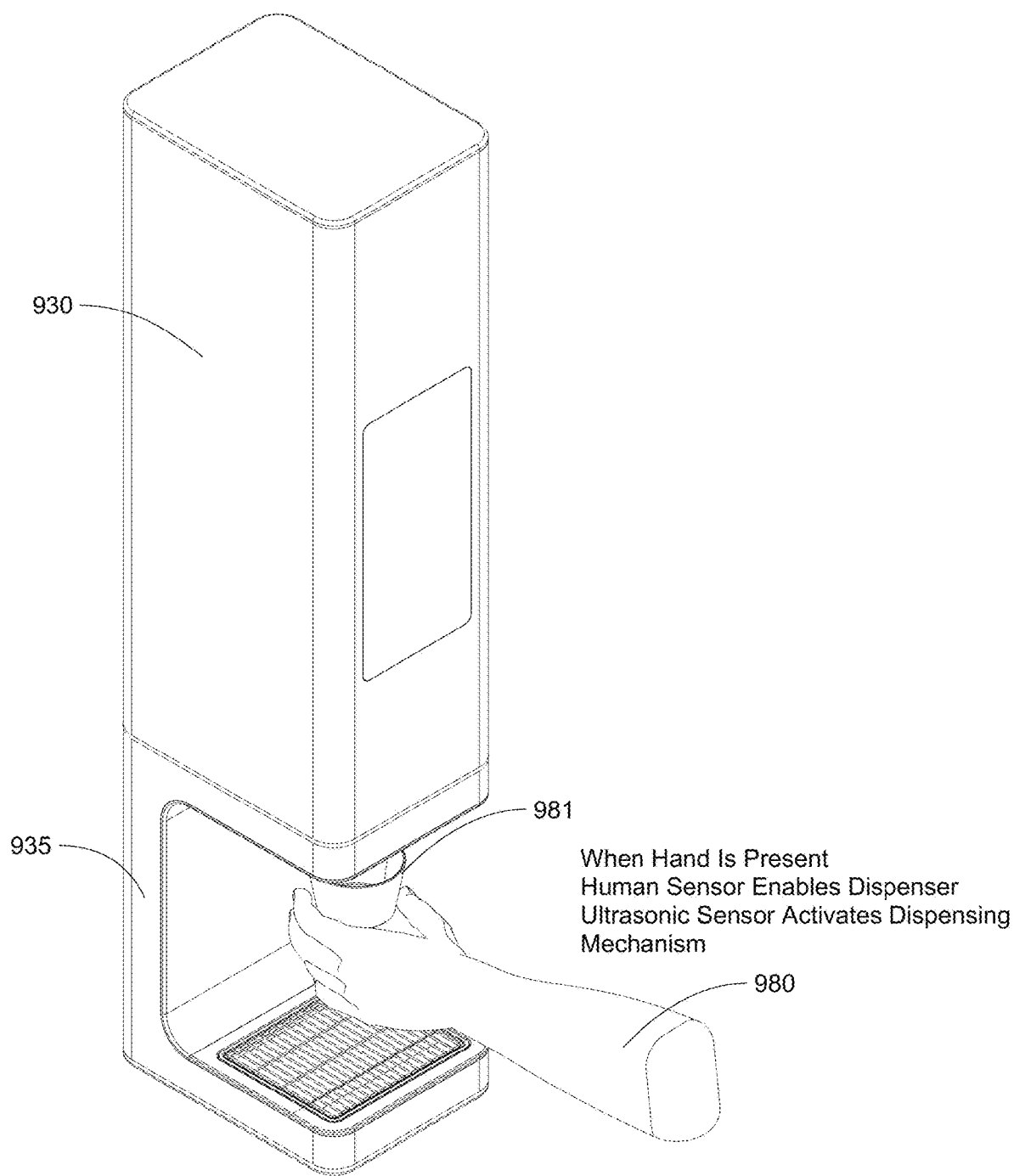
FIG. 11 illustrates a touchless condiment dispensing system in an operational mode according to some embodiments.

FIG. 10 illustrates a touchless condiment dispensing system in a stand-by mode according to some embodiments. In this illustration, the consumer's hand 980 includes a condiment receptacle or cup 981 but the consumer's hand 980 and/or condiment cup 981 has not engaged and/or activated the sensors 972. FIG. 11 illustrates a touchless condiment dispensing system in an operational mode according to some embodiments. In this illustration, the consumer's hand 980 and/or the condiment cup 981 has activated the touchless condiment system and the condiment is to be dispensed into the cup 981. In some embodiments, this is because a consumer's hand and/or movement may activate the one or more sensors 972.

Figure 15:
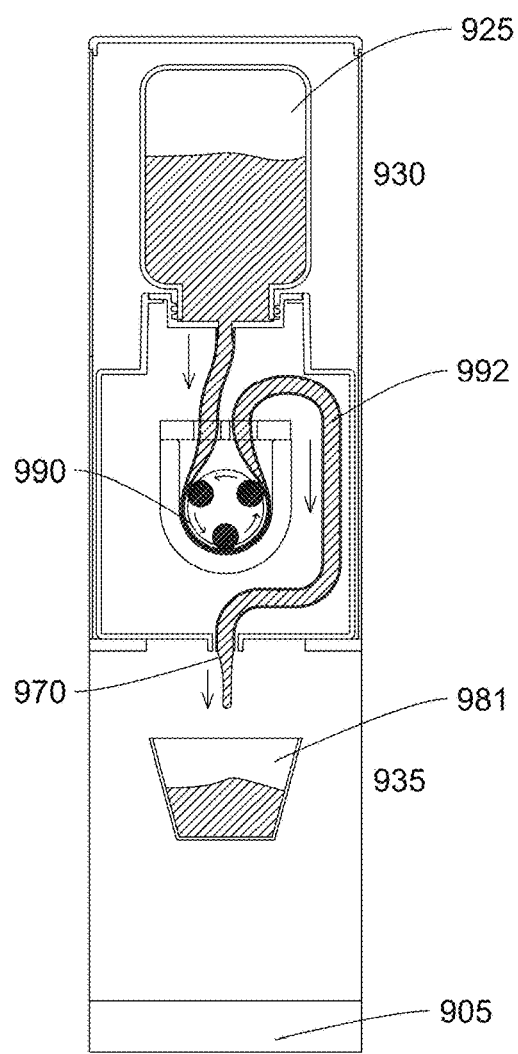
FIG. 15 illustrates distribution of the condiment into a condiment cup according to some embodiments.
Figure 16:
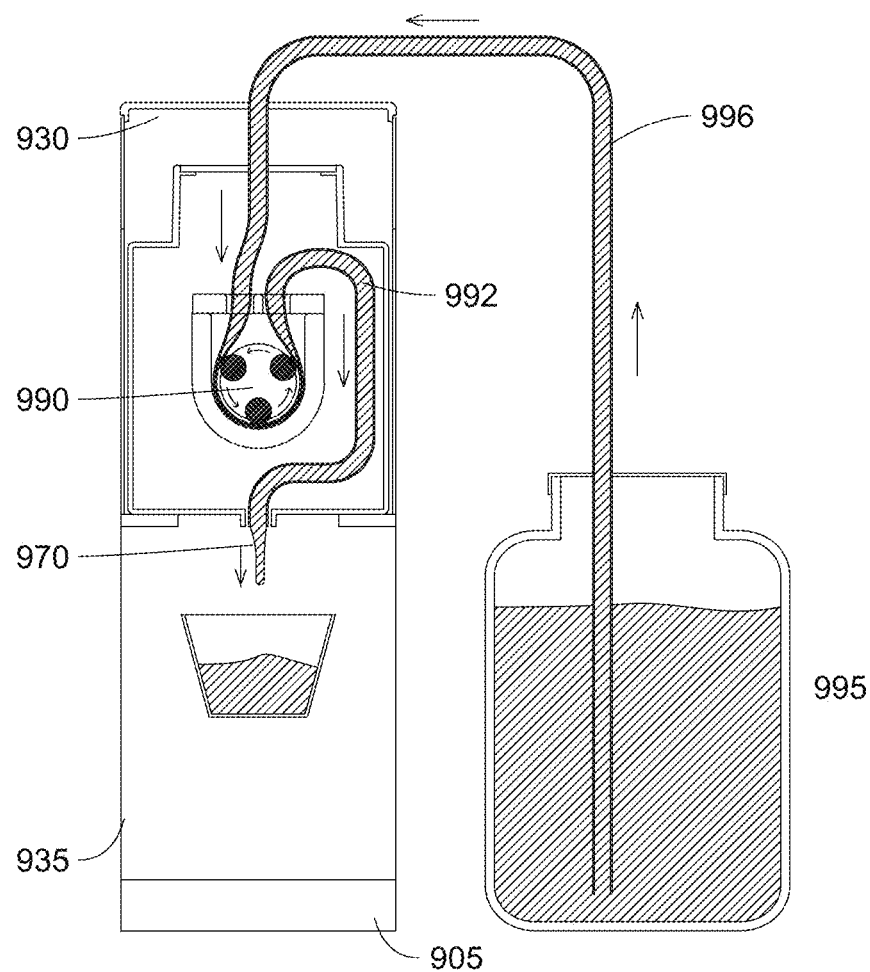
FIG. 16 illustrates distribution of the condiment into a condiment cup from an external condiment container according to some embodiments.

FIG. 15 illustrates distribution of the condiment into a condiment cup according to some embodiments. FIG. 16 illustrates distribution of the condiment into a condiment cup from an external condiment container according to some embodiments. In some embodiments, a consumer's hand is detected under the touchless condiment dispensing system. In some embodiments, one or more ultrasonic sensors 972 detects the consumer's hand 980 and activates one or more other components of the touchless condiment dispensing system 900. In some embodiments, one or more lights 151 may provide illuminate the dispensing area for the content. In some embodiments, the one or more lights 151 may be lit in coordination with the activation of the one or more sensors 972 (e.g., when a hand is detected). In some embodiments, the one or more sensors 972 may communicate with one or more processors or controllers 960 in the condiment housing 930. In some embodiments, the one or more processors 960 may execute computer-readable instructions which control operation of components and/or mechanical assemblies in the touchless condiment dispensing system. In some embodiments, for example, the computer-readable instructions 962 may include user interface computer-readable instructions 964 to control the user interface 961. In some embodiments, for example, other computer-readable instructions 963 may control operation of the display screen 920 and/or motor assembly 966. In response to the one or more sensors 972 detecting a consumer's hand 980 and/or an object (e.g., such as a condiment holder or cup 981), the one or more processors or controllers 960 may communicate instructions, commands, messages and/or signals to a motor assembly 966 to activate the motor assembly 966. In some embodiments, the pump assembly 955 may include the motor assembly 966 and/or the condiment tubing and/or the one or more rollers 990. In some embodiments, the activation of the motor assembly 966 causes a shaft of the motor assembly 966 to rotate. In some embodiments, a motor assembly 966 is attached to one or more rollers 990. In some embodiments, the rotation of the motor shaft results in rotation of the one or more rollers 990. In some embodiments, the condiment tubing runs from the condiment container 925 (in the internal version) or the external condiment container 995 (in the external version) through the condiment housing 930 (including around the one or more rollers 990) and through the upper portion of the table stand and wall mount structure 935. In some embodiments, the lower portion of the condiment tubing assembly 970 may end in a nozzle to direct the dispensing of the condiment. The portion of the condiment tubing passing the table stand and wall mount structure 935 is the lower section 970 of the condiment tubing and the section or portion of the condiment tubing in the condiment hosing 930 is the upper section 992 of the condiment tubing.

In some embodiments, e.g., where the condiment container or reservoir 995 is outside the condiment dispensing system housing 930, the condiment housing 930 may be smaller in height, e.g., may be from 0.5 inches to 3.0 inches smaller. In this embodiment, the external tubing 996 may enter the condiment housing 930 via the top or a lid of the condiment housing. The dispensing of the condiment may operate the same or very similarly in both the internal condiment version (FIG. 15) and the external condiment version (FIG. 16). FIG. 16 allows the use of existing condiment reservoirs 995 that are in the marketplace (e.g., a 114-ounce condiment reservoirs) and thus would not require a purchaser and/or the condiment vendor or seller to redesign and/or create a new condiment reservoir. In some embodiments, the condiment dispenser or reservoir 995 may be at a same level or similar level to the condiment dispensing cup. In some embodiments, the condiment dispenser or reservoir 995 may be a lower level than the condiment dispensing cup. In some embodiments, the motor assembly 966 rotates the one or more rollers 990 and this squeezes the upper section 992 of the condiment tubing. In this embodiment, the squeezing of the upper section 992 of the condiment tubing causes the condiment in the upper section 992 tubing to move toward a dispensing end of the touchless condiment system (e.g., the lower section 970 of the condiment tubing) and into the condiment cup 981. In this embodiment, the condiment may also be moved or dispensed from the condiment reservoir 925 to the upper section 992 of the condiment tubing. In this embodiment, the displacement of the condiment (e.g., the amount of condiment that is dispensed) may be controlled by the rotation of the motor assembly 966. In some embodiments, the rotation speed may be 10 rotations per minute, or alternatively may range between 5 to 20 rotations per minute. In some embodiments, the number or rotations may be counted as increments of 180 degree turns. In some embodiments, the number of rotations may be counted as increments of 360 degree turns. In some embodiments, the contactless condiment dispensing system may have a self-cleaning mode. In the self-cleaning mode, the motor assembly 966 is activated and not turned off for a number of minutes (e.g., from 2 to 6 minutes) until it purges or clears the condiment tubing 972 and 990 of the condiment. In some embodiments, the condiment reservoir 925 may also be purged or cleared during the self-cleaning mode.

In this embodiment, the computer-readable instructions executable by the one or more processors 960 may control the operation of the motor assembly 966 and thus may control the number of rotations and thus the amount of condiment that is disposed into the cup 981. In this embodiment, a predetermined number of rotations may be specific to a type of condiments. In other words, condiments with different viscosities may require more or less rotation in order to create enough pressure in the condiment tubing in order to dispense the condiment. As an example, ketchup may have only two to three rotations of the shaft and/or roller in order to be dispensed, Mayonnaise may have five or six rotations of the shaft and/or roller in order to be dispensed, and/or Tabasco may have only one rotation of the shaft and/or roller in order to be dispensed. In some embodiments, an amount or number of rotations may be controlled by a manual turning knob 956. In this embodiment, the restaurant or food service provider may set the manual turning knob 956 for a specific amount of condiment to be dispensed. In some embodiments, a contactless condiment dispensing system 900 may be controlled by a user interface 961 (which may be a touchscreen user interface). In some embodiments, the user interface 961 may allow the user or the owner of the condiment dispensing system 900 to control a number of rotations, a speed or rotation and/or to pick or select from existing preset number of rotations and/or rotation speeds. In some embodiments, the user interface 961 causes user interface (UI) computer-readable instructions 963 to be executable by the one or more processors 960 to control the operation of the motor assembly 966 and thus the amount of a type of condiment that is dispensed into a condiment cup or receptacle 981.

In some embodiments, a condiment housing 930 may include a display screen 920. In some embodiments, the display screen 920 may display a company's logo and/or an advertisement. In some embodiments, computer-readable instructions executable by one or more processors 960 may create graphic files that are communicated to the display screen 920 for presentation to the consumer. In some embodiments, one display screen may be able to control multiple contactless condiment dispensing devices. In this embodiment, a user or operation can, utilizing the display screen, choose or select different condiments and/or quantities for each of the multiple contactless condiment dispensing devices. In some embodiments, a user may input a type of food they have purchased and the contactless condiment dispensing system may analyze this type of food and then recommend a type of condiment (or types) and this may be displayed on the display screen 920. In one embodiment, the contactless condiment dispensing system may further include an imaging device and/or camera and the imaging device and/or camera may capture the content of the user's plate and the software executed by the one or more processors of the contactless condiment dispensing system may generate a condiment or condiments suggestion, which may be displayed on the display screen. In other embodiments, voice-enabled activation may be enabled by utilizing one or more microphones and/or voice recognition software (or computer-readable instructions) stored in the one or more memory devices or modules 962. In other embodiments, the contactless condiment dispensing system may include one or more speakers which could be utilized to provide the user or operator with audio feedback.

Figure 12:
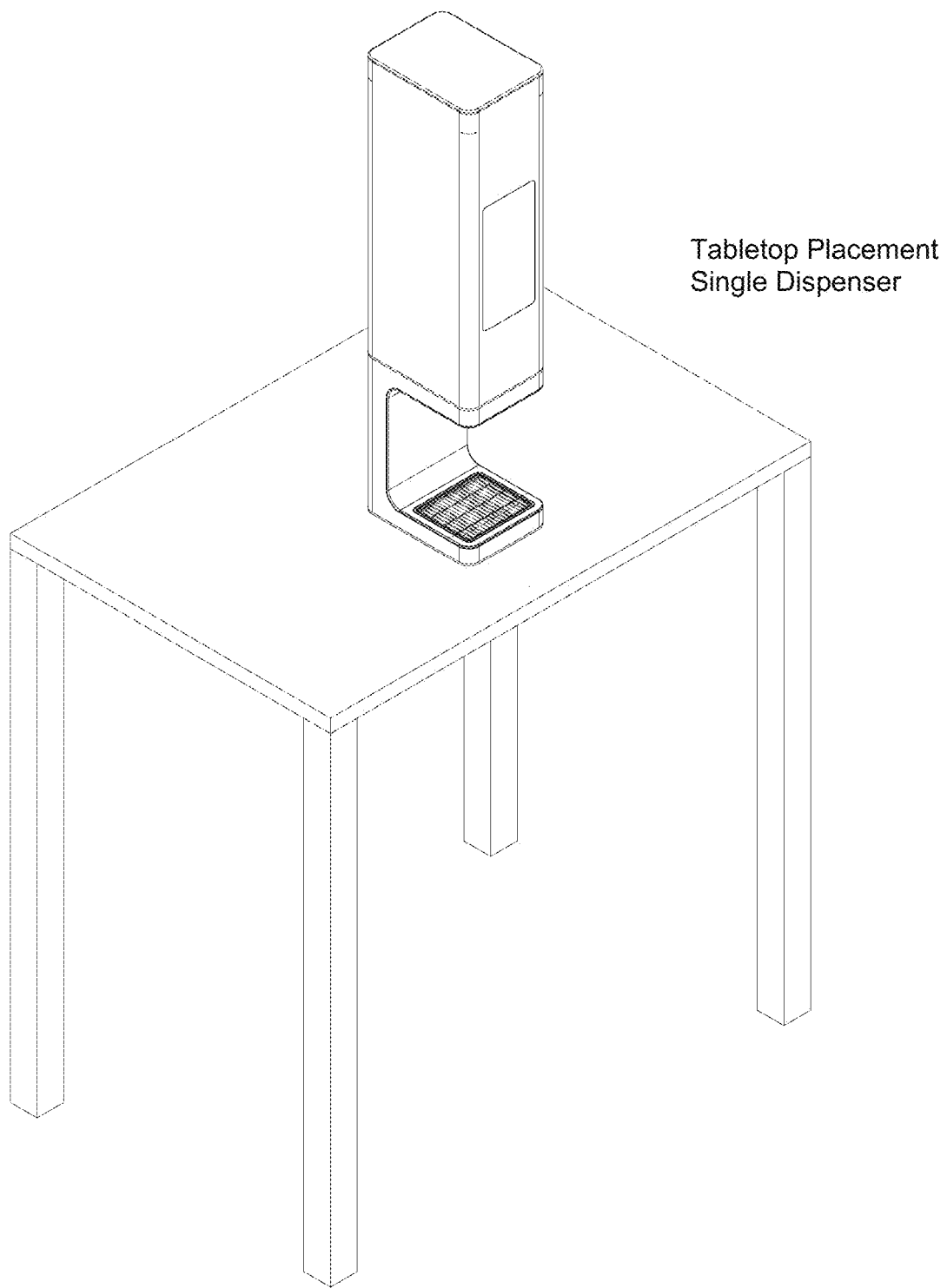
FIG. 12 illustrates table placement of a single contactless condiment dispensing system according to some embodiments.
Figure 13:
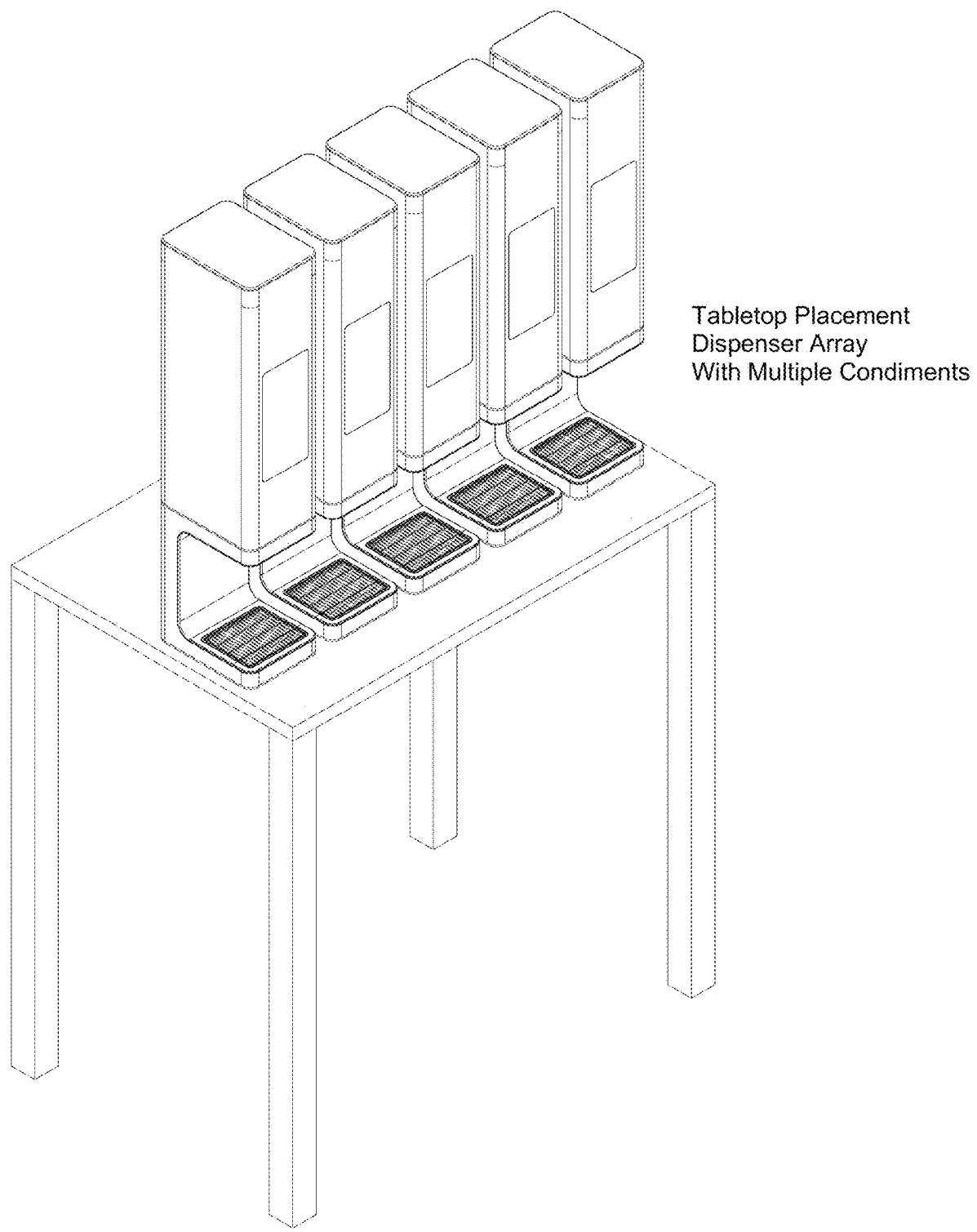
FIG. 13 illustrates table placement of multiple contactless dispensing systems according to some embodiments.
Figure 14:
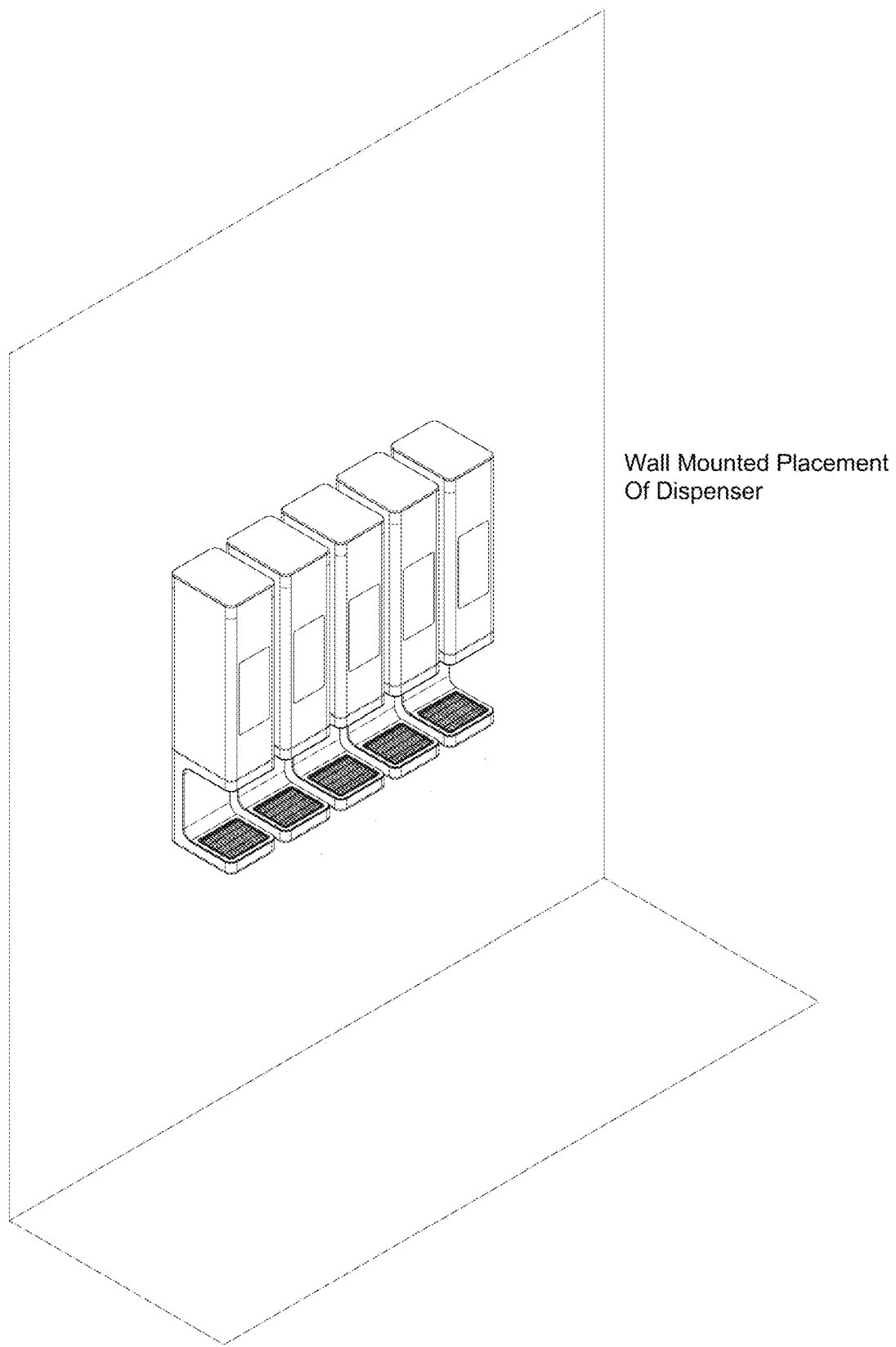
FIG. 14 illustrates multiple wall-mounted contactless condiment dispensing systems according to some embodiments.

FIG. 12 illustrates table placement of a single contactless condiment dispensing system according to some embodiments. As is illustrated in FIG. 12, the single contactless condiment dispensing system is free standing on a horizontal surface like a table top. FIG. 13 illustrates table placement of multiple contactless dispensing systems according to some embodiments. As is illustrated in FIG. 13, there are multiple contactless dispensing systems placed on a horizontal surface (e.g., a table top). The multiple contactless dispensing systems may dispense the same condiment (e.g., such as ketchup) or may dispense multiple condiments (e.g., mustard, mayonnaise, ketchup). FIG. 14 illustrates multiple wall-mounted contactless condiment dispensing systems according to some embodiments. These multiple contactless dispensing systems may dispense the same condiment or may each dispense multiple condiments.

In some embodiments, the contactless condiment dispensing system may be remote controlled by different external computing devices. In some embodiments, different external computing devices may have wireless communication transceivers that communicate with the one or more wireless communication transceivers 999 in the contactless condiment dispensing system. The wireless communication transceivers 999 in each device may utilize personal area network (PAN) protocols, wireless area network (WAN) protocols, near field communication (NFC) protocols, and/or IEEE 802.11 wireless communication protocols. This allows a user or operator to control a number of contactless condiments dispensing systems in one facility and/or in multiple facilities. In some embodiments, a mobile communications device executing a software application may control one or more contactless condiment dispensing devices. The mobile communication device may be a mobile phone, a tablet, and/or a laptop computing device. In other embodiments, a device connected to a cloud-server device may communicate instructions and/or commands and the cloud-server device may communicate with the one or more contactless condiment dispensing devices. In some embodiments, this remote control and/or access may allow setup or modification of how much of the condiment can be dispensed at one time and/or may monitor other operational parameters and/or measurements of the one of more condiment dispensing devices. For example, the operational parameters or measurements may be how many times is the contactless condiment dispensing device utilized, how much of each condiment is left, and/or are the devices operational. This remote access and/or control would then allow a user to collect, in real-time, parameters, measurements and/or data specific to usage of the devices and/or habits of consumers and this may result in more efficient flow of supply.

In some embodiments, the contactless condiment dispensing system may have a length of 5.5 inches, a width of 5.5 inches and/or a height of 12 inches. This may be an embodiment where the condiment container is outside. In other embodiments, the contactless condiment dispensing system may have a length ranging from 2 inches to 9 inches, a width ranging from 2 inches to 9 inches and/or a height ranging from 8 inches to 16 inches.

In some embodiments, where the condiment container is inside the contactless condiment dispensing system, the length may be 5.5 inches, the width may be 5.5 inches and the height may be 20 inches. In other embodiments having the condiment container inside the contactless condiment dispensing system, the contactless condiment dispensing system may have a length ranging from 2 inches to 9 inches, a width ranging from 2 inches to 9 inches and/or a height ranging from 14 inches to 26 inches. In some embodiments, a table stand may add between 4 to 10 inches in height.

In some embodiments, the housings of the contactless condiment dispensing system may be made of ABS Plastic (or other hard plastics) and/or stainless steel sheet metal. In some embodiments, the one or more rollers may be made of nylon and the studs or shafts may be made of stainless steel. In some embodiments, the condiment tubing may be made of a high temperature silicone rubber. The high temperature silicone rubber may be qualified for food and/or beverage use. Fittings and/or other components in the contactless condiment dispensing system may be made of stainless steel and/or food or beverage grade plastics.

FIG. 17A illustrates a top view of the base assembly according to some embodiments. In some embodiments, the base assembly 1700 may include a drain assembly 1710. In some embodiments, the drain assembly 1710 may be rectangular or square in shape. In some embodiments, the drain assembly 1710 may comprise removable grates 1720. In some embodiments, the removable grates 1710 (and drain assembly) may be made of a metallic material. In some embodiments, the removable grates 1710 may be held in place in the base assembly 1700 by a fixed magnet 1715. In some embodiments, a pin and/or a flush mount may hold the removable grates 1710 in place in the base assembly or dispenser mount. FIG. 17B illustrates a side view of the base assembly according to some embodiments. In some embodiments, a bottom screw or fastener 1735 may attach the dispenser and/or the base assembly 1700 to the fixed, surface mount. In some embodiments, a top screw or fastener 1730 may attach the dispenser to a stand.

A touchless condiment dispensing system includes a top lid; a dispensing system housing, the top lid allowing a condiment to be loaded into the dispensing system housing; a display screen to display operational aspects of the touchless condiment dispensing system; and a tray to capture drippage or spillage of the condiment after dispensing. The touchless condiment dispensing system includes a condiment serving space, the condiment serving space between the dispending system housing and the tray, and configured to allow a user to place a dispensing cup in the condiment serving space. The touchless condiment dispensing system further includes a base assembly in which the tray rests; and/or a dispensing support housing, the dispending support housing to connect the dispensing system housing to the base assembly.

The dispensing support housing includes one or more sensors configured to identify when the user places the dispensing cup in the condiment serving space. The dispending support housing includes one or more lights integrated therein configured to provide better visibility for the user in filling the dispensing cup in the condiment serving space. The dispensing support housing includes a first end portion of the dispensing tubing disposed therein configured to dispense the condiment into the dispensing cup.

The dispensing system housing includes a condiment reservoir and a second end portion of the dispensing tubing, the second end portion of the dispensing tubing located within the condiment reservoir and configured to deliver the condiment to the first end portion of the dispensing tubing in the dispensing support housing. The dispensing system housing further includes a pump assembly, the pump assembly configured to assist in delivering the condiment from the second end of the dispensing hose to the first end of the dispensing hose and to the dispensing cup. In some embodiments, the pump assembly includes a motor assembly and one or more rollers, wherein the motor assembly rotates a shaft of the motor assembly and the one or more rollers and the rotation of the one or more rollers squeezes the dispensing hose which results in the condiment to begin to be dispensed. In some embodiments, the touchless condiment dispensing system includes one or more controllers, one or more memory modules, and/or computer-readable instructions, the computer-readable instructions stored in the one or more memory modules, retrieved from the one or more memory modules, and executable by the one or more controllers to cause the motor assembly to be activated and start to rotate. In some embodiments, the touchless condiment dispensing system includes a power supply to provide power to the pump assembly, the one or more controllers, and/or the and the one or more memory modules. In some embodiments, the power supply is battery and is replaceable or rechargeable. In some embodiments, the touchless condiment dispensing system includes one or more solar cells, the one or more solar cells configured to capture light, convert the light to electrical power and to provide the power to the power supply or battery.

In some embodiments, the one or more sensors are self-powered and do not need power from a power supply or a battery. In some embodiments, the one or more sensors may be ultrasonic sensors, magnetic sensors, light sensors and/or RFID sensors. In some embodiments, the touchless condiment dispensing system includes one or more wireless communication transceivers, the computer-readable instructions are executable by the one or more processors to cause the one or more wireless communication transceivers to communicate with one or more additional touchless condiment dispensing systems. In some embodiments, the tray is located in the base assembly, is configured to be removable from the base assembly, to include a grid with vents, and to not touch a surface on which the touchless condiment dispensing system is placed or rests. In some embodiments, the dispensing system housing includes a graphic screen, the graphic screen to display advertising and/or graphics.

In some embodiments, the condiment system housing further includes a manual turning knob, wherein the manual tuning knob is configured to dispense a specific amount of condiment by controlling a number of partial turns or turns of one or more rollers by a motor assembly. In some embodiments, the condiment system housing includes an internal input screen or user interface to allow a number of rotations of a motor assembly in a pump assembly and/or a speed of rotation to be selected or configured. In some embodiments, the computer-readable instructions are executable by the one or more controllers to initiate a self-cleaning mode, the self-cleaning mode to automatically activate the motor assembly and continuously run the motor assembly for a set period of time to clean the condiment out of the dispensing tubing.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure.

Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

The invention claimed is:

1. A touchless condiment dispensing system, comprising: a top lid;
- a dispensing system housing, the top lid allowing a condiment to be loaded into the dispensing system housing;
- a display screen to display operational aspects of the touchless condiment dispensing system, the display screen including a user interface, a tray to capture drippage or spillage of the condiment after dispensing;
- a condiment serving space, the condiment serving space between the dispending system housing and the tray, and configured to allow a user to place a dispensing cup in the condiment serving space;
- a base assembly in which the tray rests;
- a dispensing support housing, the dispending support housing to connect the dispensing system housing to the base assembly;
- one or more wireless communication transceivers; and
- one or more controllers, one or more memory modules, and/or computer-readable instructions, the computer-readable instructions stored in the one or more memory modules, retrieved from the one or more memory modules, and executable by the one or more controllers to allow the user interface of the display screen to control one or more other touchless condiment dispensing systems by communicating through the one or more wireless communication transceivers and to select different condiments and/or quantities for each of the one or more other touchless condiment dispensing systems.

2. The touchless condiment dispensing system of claim 1, the dispensing support housing including one or more sensors configured to identify when the user places the dispensing cup in the condiment serving space and one or more lights integrated therein to provide better visibility for the user in filling the dispensing cup in the condiment serving space.

3. The touchless condiment dispensing system of claim 2, wherein the one or more sensors are self-powered and do not need power from a power supply or a battery.

4. The touchless condiment dispensing system of claim 2, wherein the one or more sensors may be ultrasonic sensors, magnetic sensors, light sensors or RFID sensors.

5. The touchless condiment dispensing system of claim 1, the dispensing support housing including a first end portion of a dispensing tubing disposed therein configured to dispense the condiment into the dispensing cup.

6. The touchless condiment dispensing system of claim 5, the dispensing system housing including a condiment reservoir and a second end portion of the dispensing tubing, the second end portion of the dispensing tubing located within the condiment reservoir and delivering the condiment to the first end portion of the dispensing tubing in the dispensing support housing.

7. The touchless condiment dispensing system of claim 6, the dispensing system housing further including a pump assembly, the pump assembly configured to assist in delivering the condiment from the second end of the dispensing tubing to the first end of the dispensing tubing and to the dispensing cup.

8. The touchless condiment dispensing system of claim 7, wherein the pump assembly includes a motor assembly and one or more rollers, wherein the motor assembly rotates a shaft of the motor assembly and the one or more rollers and the rotation of the one or more rollers squeezes the dispensing tubing which results in the condiment to begin to be dispensed.

9. The touchless condiment dispensing system of claim 8, the computer-readable instructions stored in the one or more memory modules, retrieved from the one or more memory modules, and executable by the one or more controllers to cause the motor assembly to be activated.

10. The touchless condiment dispensing system of claim 9, further comprising a power supply to provide power to the pump assembly, the one or more controllers, and/or the and the one or more memory modules.

11. The touchless condiment dispensing system of claim 10, wherein the power supply is a battery and is replaceable or rechargeable.

12. The touchless condiment dispensing system of claim 11, further comprising one or more solar cells, the one or more solar cells to capture light, convert the light to electrical power and to provide the power to the battery.

13. The touchless condiment dispensing system of claim 1, wherein the tray is located in the base assembly, is configured to be removable from the base assembly, to include a grid with vents, and to not touch a surface on which the touchless condiment dispensing system is placed or rests.

14. The touchless condiment dispensing system of claim 1, the dispensing system housing including a graphic screen, the graphic screen to display advertising and/or graphics.

15. The touchless condiment dispensing system of claim 1, the condiment system housing further including a manual turning knob, wherein the manual tuning knob is configured to dispense a specific amount of condiment by controlling a number of partial turns or turns of one or more rollers by a motor assembly.

16. The touchless condiment dispensing system of claim 1, wherein the user interface to allow a number of rotations of a motor assembly in a pump assembly and/or a speed of rotation to be selected or configured.

17. A touchless condiment dispensing system, comprising: a top lid;
- a dispensing system housing, the top lid allowing a condiment to be loaded into the dispensing system housing;
- a display screen to display operational aspects of the touchless condiment dispensing system, the display screen including a user interface,
- a tray to capture drippage or spillage of the condiment after dispensing;
- a condiment serving space, the condiment serving space between the dispending system housing and the tray, and configured to allow a user to place a dispensing cup in the condiment serving space;
- a base assembly in which the tray rests;
- a dispensing support housing, the dispending support housing to connect the dispensing system housing to the base assembly, the dispensing support housing including a camera; and
- the touchless condiment dispensing system further including one or more controllers, one or more memory modules, and/or computer-readable instructions, the computer-readable instructions stored in the one or more memory modules, retrieved from the one or more memory modules, and executable by the one or more controllers to control the camera to capture an image of a user's plate, to analyze the captured image, to generate a condiment or condiments suggestion and to display the condiment or condiments suggestion on the display screen.

18. The touchless condiment dispensing system of claim 3, further comprising one or more wireless communication transceivers, and
- one or more controllers, one or more memory modules, and/or computer-readable instructions, the computer-readable instructions stored in the one or more memory modules, retrieved from the one or more memory modules,
- the computer-readable instructions executable by the one or more processors to cause the one or more wireless communication transceivers to communicate operational parameters or measurements to an external device, the operational parameters including how many times the touchless condiment dispensing systems has been utilized, how much of a condiment is left and operational status of the touchless condiment dispensing system.

19. A touchless condiment dispensing system, comprising:
- a top lid;
- a dispensing system housing, the top lid allowing a condiment to be loaded into the dispensing system housing;
- a display screen to display operational aspects of the touchless condiment dispensing system;
- a tray to capture drippage or spillage of the condiment after dispensing;
- a condiment serving space, the condiment serving space between the dispending system housing and the tray, and configured to allow a user to place a dispensing cup in the condiment serving space;
- a base assembly in which the tray rests;
- a dispensing support housing, the dispending support housing to connect the dispensing system housing to the base assembly, the dispensing system housing further including a pump assembly, the pump assembly configured to assist in delivering the condiment from the second end of a dispensing hose to the first end of the dispensing hose and to the dispensing cup, wherein the pump assembly includes a motor assembly and one or more rollers, wherein the motor assembly rotates a shaft of the motor assembly and the one or more rollers and the rotation of the one or more rollers squeezes the dispensing hose which results in the condiment to begin to be dispensed; and
- one or more controllers, one or more memory modules, and/or computer-readable instructions, the computer-readable instructions stored in the one or more memory modules, retrieved from the one or more memory modules, and executable by the one or more controllers to cause the motor assembly to be activated and start to rotate,
- wherein the computer-readable instructions executable by the one or more controllers to initiate a self-cleaning mode, the self-cleaning mode to automatically activate the motor assembly and continuously run the motor assembly for a set period of time to clean the condiment out of the dispensing hose.

\* \* \* \* \*